(12) United States Patent
Kinsey

(10) Patent No.: US 12,301,567 B2
(45) Date of Patent: May 13, 2025

(54) SYSTEMS AND METHODS FOR IDENTITY VERIFICATION

(71) Applicant: Global Accountability Corporation, Great Falls, MT (US)

(72) Inventor: James Michael Kinsey, Great Falls, MT (US)

(73) Assignee: Global Accountability Corporation, Great Falls, MT (US)

(*) Notice: Subject to any disclaimer, the term of this patent is extended or adjusted under 35 U.S.C. 154(b) by 0 days.

(21) Appl. No.: 18/754,444

(22) Filed: Jun. 26, 2024

(65) Prior Publication Data

US 2025/0055843 A1 Feb. 13, 2025

Related U.S. Application Data

(60) Provisional application No. 63/518,617, filed on Aug. 10, 2023.

(51) Int. Cl.
*H04L 9/40* (2022.01)
(52) U.S. Cl.
CPC ................. *H04L 63/0861* (2013.01)
(58) Field of Classification Search
None
See application file for complete search history.

(56) References Cited

U.S. PATENT DOCUMENTS

| 7,522,056 | B2 | 4/2009 | Roque |
| 8,538,775 | B2 | 9/2013 | Skomra |
| 9,456,302 | B2 | 9/2016 | Skomra et al. |
| 10,187,754 | B1 | 1/2019 | Hansen |
| 10,552,954 | B2 * | 2/2020 | Beck ...................... A61B 5/743 |
| 10,789,586 | B2 | 9/2020 | Wilson et al. |
| 11,978,035 | B2 * | 5/2024 | Maragoudakis ..... G06Q 20/102 |
| 2003/0179229 | A1 * | 9/2003 | Van Erlach ........... G06F 1/1626 |
| | | | 715/744 |

(Continued)

OTHER PUBLICATIONS

International Preliminary Report on Patentability issued in International Application No. PCT/US2021/036629, mailed on Dec. 22, 2022, 8 pages.

(Continued)

*Primary Examiner* — Piotr Poltorak
(74) *Attorney, Agent, or Firm* — Dorsey & Whitney LLP

(57) ABSTRACT

Verifying an identity of a first user over a network involves using a first computing device to obtain, from a near-field communication (NFC) device held by an article, an access request to a network-based service, where the access request is obtained by confirming biometric information the first user; and transmit the access request for the first computing device to receive access to the network-based service. Using a second computing device to obtain information from the article holding the NFC device; transmit a request for the second computing device to access the network-based service that includes the obtained information and a location of the second computing device; and receiving confirmation that the second computing device has been granted access to the network-based service upon confirming a location match is present between the first and second computing devices and confirming the first computing device has been granted access to the network-based service.

16 Claims, 2 Drawing Sheets

(56) References Cited

U.S. PATENT DOCUMENTS

| | | | |
|---|---|---|---|
| 2004/0230811 A1* | 11/2004 | Siegel | H04L 63/0861 |
| | | | 713/186 |
| 2005/0011092 A1 | 1/2005 | Bruscini | |
| 2006/0267773 A1 | 11/2006 | Roque | |
| 2009/0117879 A1 | 5/2009 | Pawar et al. | |
| 2009/0284347 A1 | 11/2009 | Zimmerman | |
| 2010/0064350 A1* | 3/2010 | Dondeti | H04W 12/062 |
| | | | 380/278 |
| 2014/0043141 A1 | 2/2014 | Cazanas et al. | |
| 2014/0167963 A1 | 6/2014 | Ferragne | |
| 2016/0300189 A1 | 10/2016 | Ferreira De Souza et al. | |
| 2017/0126672 A1 | 5/2017 | Jang | |
| 2017/0324750 A1 | 11/2017 | Khan | |
| 2017/0357936 A1 | 12/2017 | Byington et al. | |
| 2018/0082304 A1 | 3/2018 | Summerlin et al. | |
| 2019/0028851 A1 | 1/2019 | Hansen | |
| 2019/0156345 A1 | 5/2019 | Chen et al. | |
| 2020/0213298 A1 | 7/2020 | Ericson | |
| 2021/0105265 A1 | 4/2021 | Yang et al. | |
| 2021/0287317 A1* | 9/2021 | Phillips | H04W 12/068 |
| 2021/0385659 A1 | 12/2021 | Gibbs | |
| 2022/0210150 A1* | 6/2022 | Neubauer | H04W 4/022 |
| 2022/0245224 A1* | 8/2022 | Rojas | G06V 40/197 |
| 2023/0216693 A1 | 7/2023 | Singh et al. | |
| 2023/0308881 A1 | 9/2023 | Gibbs | |

OTHER PUBLICATIONS

International Search Report and Written Opinion issued in International Application No. PCT/US2021/036629, mailed on Oct. 5, 2021, 9 pages.

International Search Report and Written Opinion issued in International Application No. PCT/US2024/035560, mailed on Sep. 17, 2024, 10 pages.

Brand, Christiaan, et al., "Enabling Strong Authentication with WebAuthn", 5 pages, May 2018, Google Developers, retrieved from https://developers.google.com/web/updates/2018/05/webauthn.

* cited by examiner

SYSTEMS AND METHODS FOR IDENTITY VERIFICATION

CROSS-REFERENCE TO RELATED APPLICATIONS

This application claims priority to U.S. Provisional Patent Application No. 63/518,617, filed on Aug. 10, 2023, entitled "SYSTEM AND METHODS FOR IDENTITY VERIFICATION", which is incorporated by reference herein, in the entirety and for all purposes.

TECHNICAL FIELD

Systems and methods for verifying a user over a network use a communication device assigned to the user, an electronic reader, and a mobile device of the assigned user.

BACKGROUND

U.S. Pat. No. 7,522,056 discloses general means of attached an RFID device to a badge and use of the RFID device to track the location of the badge. Unfortunately, the prior art fails to provide means and methods of allowing second parties, such as members of the public to electronically interact with or about an enabled badge or person wearing an enabled badge. Events of recent years have facilitated the need for a tool the public can use to document their interactions other members of the community, including the police community.

The interaction between a police officer and a member of the public can be compared to an interaction between a customer and a provider of service; this paradigm is the primary assumption of this application, and as such this application can be employed to facilitate a number of other similar interactions between users.

SUMMARY

According to certain implementations, a method for verifying an identity of a first user over a network, may involve, at a first computing device: obtaining, from a near-field communication device held by an article, an access request for the first computing device to access a network-based service, where the first computing device is separate from the article holding the near-field communication device, and where the access request is obtained based on confirming biometric information associated with the access request corresponds to previously stored biometric information of the first user. Then transmitting the access request from the first computing device, over the network, requesting the first computing device receive access to the network-based service. The method may proceed at a second computing device, and may involve: obtaining, from the article holding the near-field communication device, a second set of information, where the second computing device is separate from the article holding the near-field communication device. A request from the second computing device may be transmitted over the network for the second computing device to access the network-based service, where the request from the second computing device may include the second set of information obtained from the article holding the near-field communication device and a location of the second computing device. Confirmation may be received that the second computing device has been granted access to the network-based service based on the network-based service confirming a location match is present between the first and second computing devices and confirming the first computing device has been granted access to the network-based service, where the confirmation includes a confirmation of the identity of the first user.

In various implementations and alternatives, confirming biometric information associated with the access request corresponds to previously stored biometric information of the first user, may involve the first user entering biometric information into the article holding the near-field communication device, and by the article holding the near-field communication device confirming the entered biometric information matches the previously stored biometric information, said previously stored biometric information being stored in the near-field communication device held by the article.

In such implementations and alternatives, prior to the confirming biometric information associated with the access request corresponds to previously stored biometric information of the first user, the near-field communication device may be prevented from transmitting the access request to the first computing device.

In various implementations and alternatives, prior to transmitting the access request, the first computing device may be authenticated using information from the access request.

In various implementations and alternatives, the method may further involve, at the second computing device, displaying a confirmation of the identity of the first user, and a user interface for a user of the second communication device to provide input into an account of the first user for storage in memory of the network.

In various implementations and alternatives, the method may further involve, at the first computing device, receiving a confirmation that the first computing device has been granted access to the network-based service based on the access request.

In various implementations and alternatives, the first device may transmit a location of the first device based on the second computing device transmitting the request to access the network-based service.

In various implementations and alternatives, the first device may transmit a location of the first device based on the second set of information being obtained.

In various implementations and alternatives, the first computing device may be a first mobile device and where the second computing device is a second mobile device.

According to further implementations, a method for verifying an identity of a first user over a network, may involve: receiving, by a network processor, a network access request for an authenticated first computing device of the first user to access to a network-based service of the network, where the network access request of the authenticated first computing device is received at least based on receiving authentication information corresponding to biometric information of the first user stored in the authenticated first computing device matching biometric information of the first user stored in a near-field communication device held by an article, where the authenticated first computing device is separate from the article holding the near-field communication device. The network processor may grant the authenticated first computing device access to the network-based service. The network processor may receive a request from a communicatively coupled second computing device to the network-based service, where the request may include a first set of information retrieved from the near-field communication device held by the article and a second set of information related to the communicatively coupled second computing device from which the request was sent, where the second computing device is separate from the article holding the near-field communication device, where the first set of information may include an identification of the first user, and where the second set of information may include a location of the communicatively coupled second computing device. The network processor may retrieve a location of the authenticated first computing device. The network processor may determine whether a location match is present between the second computing device and the authenticated first computing device. The network processor may grant the second computing device access to the network-based service based on determining the location match is present and based on confirming the authenticated first computing device has been granted access to the network-based service, where the granted access may include providing access to information of the first user at the second computing device, where a confirmation of the identity of the first user is provided.

In various implementations and alternatives, upon determining the location match is present, the network processor may generate a timestamp and location record of one or more of the authenticated first computing device or the second computing device.

In various implementations and alternatives, upon granting the second computing device access to the network-based service, enabling a user of the second computing device to provide input into an account of the first user for storage in the network-based service.

In various implementations and alternatives, where when the location match is not present or the first user has not been granted access to the network-based service, transmitting for display, by the network processor, a message to the second computing device indicating the identity of the first user is not confirmed, and instructing a user of the second computing device to take a secondary action.

In various implementations and alternatives, the instructions for taking the secondary action may include instructions for contacting a peacekeeping authority or a supervisor of the first user assigned to the article holding the near-field communication device.

In various implementations and alternatives, where the granting of the authenticated first computing device access to the network-based service is for a pre-determined period of time; and where the network processor grants the second computing device access to the network-based service based on determining the location match is present during the pre-determined period of time. In such implementations and alternatives, when the location match is present after the pre-determined period of time has expired, the method further involves, transmitting for display, by the network processor, a message to the second computing device indicating the identity of the first user is not confirmed, and instructing a user of the second computing device to take a secondary action. In addition or alternatively, the instructions for taking the secondary action include instructions for contacting a peacekeeping authority or a supervisor of the first user assigned to the article holding the near-field communication device.

DETAILED DESCRIPTION

Systems and methods for verifying a user of an authenticated article and an authenticated mobile device are disclosed herein. Certain details are set forth below to provide a sufficient understanding of embodiments of the disclosure. However, embodiments of the disclosure may be practiced without these particular details. Moreover, the particular embodiments are provided by way of example and should not be construed as limiting. In other instances, well-known circuits, control signals, timing protocols, and software operations have not been shown in detail to avoid unnecessarily obscuring the disclosed embodiments.

The disclosure generally relates to verification of the identity of a registered user of a network-based service in which an authenticated article is used to verify the identity of the registered user using an authenticated mobile device. Briefly, identity verification includes granting the registered user access to the network-based service, and then verifying the registered user is in possession of an authenticated article using a reader possessed by a second user, such as a member of the public during an encounter with a police officer in possession of the authenticated article that enables members of the public to verify the identity of the police officer. In response to verification, the second user may access information about the assigned user (i.e., a first user when the first user's identity is verified) and may interact with features of the network-based service that may enable the second user to provide feedback about the encounter, such as by rating and reporting the performance of the assigned user.

Embodiments of the present disclosure further generally relate to expanding the capabilities of near-field communication devices such as NFC chips that may be held by the authenticated article of the present disclosure. While NFC chips may typically be used to provide limited information to a reader, the present disclosure enables the information to be used in connection with confirming a registered user is in possession of the authenticated article followed by identity verification of the registered user by a second user (e.g., a member of the public) and instigating secure data collection by the network-based service.

Figure 1:
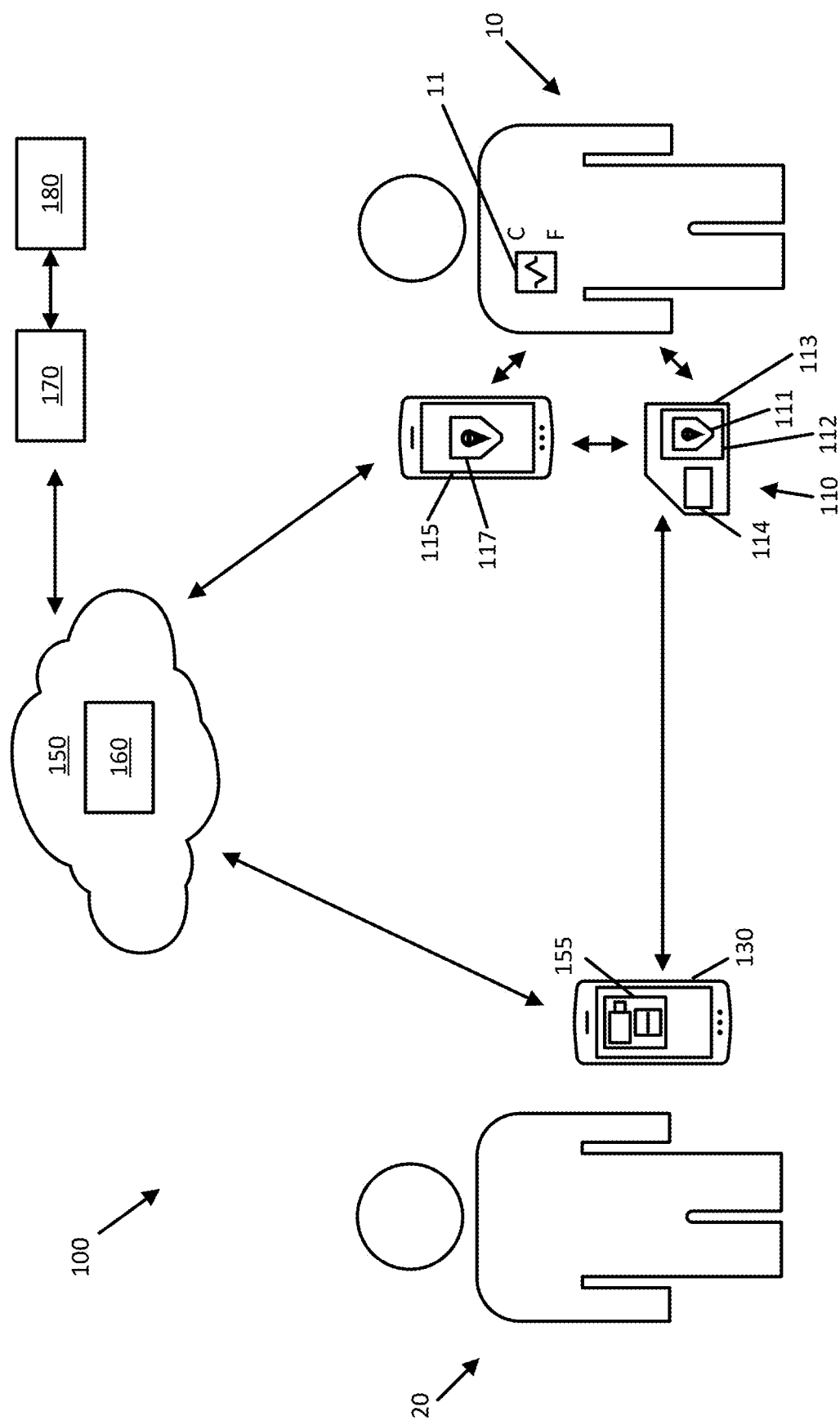
FIG. 1 illustrates a diagram of a networking environment configured to verify a first user of an authenticated device and authenticated article during an encounter with a second user in possession of a reader, according to the present disclosure.

Turning to FIG. 1, illustrated is a diagram of a network 100 that may be used for identity verification through device authentication, according to the present disclosure. The network 100 may include an authenticated article 110, a separate authenticated mobile device 115, a reader 130, and a server 150, a network-based service 160, a data processing layer 170.

A first user 10 may be an assigned user of both the authenticated article 110 (e.g., a near-field communication device held by an article such as a card or badge) and of the authenticated mobile device 115 and biometric information 11 of the first user 10 may be used in connection with gaining access to a network-based service 160 deployed by the server 150. A second user 20 may be a person in possession of the reader 130 who is in close proximity to the authenticated article 110, which may be used by the second user 20 to verify the first user 10 is the assigned user of the authenticated article 110. In implementations, the first user 10 may require verification, for instance, during an encounter between a person purporting to have authority (e.g., a police officer) and the second user 20 such as a member of the public, and the network 100 of the present disclosure may be used to verify the first user of the authenticated article 110 and the authenticated mobile device 115 as disclosed herein.

The authenticated article 110 may include an input region 111, a near-field communication device 112 (NFC device) held by an article 113, and content 114.

The authenticated article 110 may be assigned to the first user 10 through an enrollment process in which the user establishes a user account in the network-based service 160 of the network 100, which may be managed or authorized for use by the assigned user's employer (e.g., police precinct, security company, governmental agency, armed forces, etc.). For instance, prior to authentication of the authenticated article 110, the NFC device 112 may be scanned into the network 100 and entered into the assigned user's profile stored on the network 100, e.g., in the network-based service 160. In addition or alternatively, the NFC 112 device may be programmed to be initialized by receiving information specific to the first user 10 such as by receiving biometric information 11 of the first user 10 at the input region 111 of the authenticated article 110. Upon the NFC device 112 writing the specific information of the first user 10 into memory thereof, the NFC device 112 may be prevented from being re-initialized. In examples, the NFC device 112 may store the biometric information 11 such as a fingerprint, palm print, palm-vein pattern, facial image, or iris scan of the first user 10 during initialization in a secured memory, and thereafter the NFC device 112 may be configured to read the first user's biometric information 11 subsequently input by the first user 10 via the input region 111, but may be prevented from storing new biometric information 11 of the first user 10 or other users of the network 100 in the secured memory of the NFC device 112. In this way, the authenticated article 110 may be assigned to only a first user 10 one time. In addition or alternatively, a unique identification number of the authenticated article 110 may be assigned to the assigned user's profile. When data on the authenticated article 110 is accessed, the assigned user's profile, or public portions thereof, may be visible on a website and accessible to a second user, as provided further herein.

The near-field communication device (NFC device) 112 of the authenticated article 110 may be embedded in or placed on the article 113. The NFC device 112 may be configured to transmit information to other devices such as by an antennae. The NFC device may be a passive NFC device or an active NFC device. Passive NFC devices generally do not include a power source and connect to active devices such as a reader 130 disclosed herein. Active NFC devices generally include a power source and can transmit and receive data by switching from a transmitting (active) state to a passive (receiving) state. Near-field communications may employ magnetic coupling to send and receive signals when the NFC-enabled devices are in close proximity (e.g., touching to 20 cm). An electromagnetic field created during the coupling allows the active NFC device to be powered and communicate with the passive NFC device. The active NFC device receives signals of the passive device and decodes the received information. In some implementations, the NFC device may be locked or prevented from transmitting data until the NFC device 112 is unlocked. Accordingly, the NFC device 112 of the authenticated article 110 may have a locked state and an unlocked state. Authentication information, such as biometric information 11, haptic input, or a password may be read by the NFC device to unlock the NFC device 112. In an example of unlocking the NFC device 112 using biometric information, the first user 10 may enter their biometric information 11 into the NFC device such as by touching the input region 111 of the authenticated article 110 configured with a sensing surface, and the input region 111 sensing surface may sense the biometric information 11 such as the fingerprint, palm print, palm-vein pattern, facial image, or iris scan. Upon biometric authentication, the NFC device 112 may be unlocked enabling the authenticated article 110 to transmit data to a device in close proximity, for instance to the mobile device 115 and/or the reader 130 in connection with providing access to the network-based service 160.

The NFC device 112 may store data such as a website address (URL) or information about the assigned user of the authenticated article 110. For instance, the NFC device 112 may store information particular to the authenticated article 110 such as details unique to the assigned user, which may include biometric information 11 of the assigned user being the first user 10, credentials (e.g., badge or registration number), employment location (e.g., military or civilian location), name, gender, and other details associated with the assigned user such as number of years of service, past ratings by other second users, and so on. In addition, a website address stored in the authenticated article 110 may provide access to this and other information. The memory of the NFC device 112 may include read/write memory, read-only memory and combinations thereof.

The article 113 of the authenticated article 110 may be an object such as a portable card (e.g., PVC card), a badge (e.g. a police badge), or an appliance that can be easily carried by the first user 10 of the authenticated article 110. The authenticated article 110 may be limited in size and data transmission capabilities, which may provide benefits due to it being easily portable and storable. This enables the first user 10 of the authenticated article 110 to present it only when needed, and may enable the first user 10 to engage with others, e.g., with members of the public as second users, more easily compared to when a larger or less portable CPU-type device is used for initial verification. In some cases, the article 113 may not include other computer or communication components, and the article 113 and authenticated article 110 may only be configured as having limited data transmission capabilities. Accordingly, as provided herein, the first user 10 of the authenticated article 110 may use the authenticated article 110 to gain access to the network-based service 160 and may then present their authenticated article 110 to other devices carrying readers 130 described herein, such as a member of the public carrying a mobile phone having a preinstalled reader 130, to implement the verification processes of the present disclosure.

The content 114 of the authenticated article 110 may for instance be printed information that may be human readable and/or machine readable for instance via an optical device such as a camera or other reading device of the reader 130. The content 114 may be information in the form of text or images such as a bar code, QR code, a picture of the first user 10, and combinations. In some cases, the information provided as content 114 may be the same as or overlap with information stored in the near-field communication device 112.

The authenticated mobile device 115 may be communicatively coupled over the network 100 and for instance may configured to receive data from the authenticated article 110, e.g., data from the NFC device 112, along with other functions customary to mobile devices including receiving cellular and wireless communications. A reader 116 of the authenticated mobile device 115 may be configured to obtain or receive information from the authenticated article 110 such as by receiving information transmitted from the NFC device 112 and/or by obtaining content 114 from the authenticated article 110 such as by optical recognition of a QR code or scanning a bar code. An input region 117 of the authenticated mobile device 115 may be configured to read biometric information, such as the first user's biometric information 11 input by the first user 10 while the user 10 is in possession of the authenticated mobile device 115. For instance, the user 10 may enter their biometric information 11 by placing their face or other portion of their body proximate a sensor or sensing surface or by touching the sensor or sensing surface of the input region 117. In some cases, the input region 117 may be used to enter biometric information 11 of the first user 10 during initialization of the authenticated article 110 and/or during initialization of an account of the first user 10 of the network-based service 160. The authenticated mobile device 115, its associated reader 116 and input region 117 may be a cellular phone, a body camera, and/or may additionally include camera, microphone, GPS, accelerometer, as well as other functionalities common to cellular phones, which may also include a web browser and camera, and frequently used by assigned users serving as first users 10 such as officers, security guards or government service persons and may be used in connection with verification of their assigned user status. Alternatively, the authenticated mobile device 115 may be communicatively coupled to one or more devices having reader 116, input region 117, a cellular phone, a camera, a microphone, a browser, and accelerometer functionalities.

The reader 130 may be a mobile phone with the same or similar configuration to the authenticated mobile device 115. In some cases, the reader 130 may be a mobile device that is possessed by a second user 20 and such user may not be enrolled in the system 100, e.g., the second user 20 of the reader 130 may not have a user account in the system 100 and may be unfamiliar with the first user, and further, may be unfamiliar with the assigned user of the authenticated article 110 if not the same as the first user 10. For instance, the second user 20 member of the public and the first user 10 purporting to be the assigned user may be strangers to each other, and thus the systems and methods of the present disclosure may be used in connection with the second user 20 receiving electronic confirmation that a first user 10, that is otherwise a stranger, is an assigned user of the authenticated article 110, thus enabling electronic confirmation that the first user 10 is an assigned user and is thus who they say they are.

The reader 130 broadly may be configured as an electronic chip reader (e.g., NFC chip reader) and may include a processing unit, memory, wireless communication capabilities and a web browser. The reader 130 may be a cellular phone and/or may additionally include camera, microphone, GPS, accelerometer, as well as other functionalities common to cellular phones and frequently used by members of the public. Alternatively, the reader 130 may be communicatively coupled to a device having cellular phone, camera, microphone, browser, and accelerometer functionalities.

When the reader 130 is configured as an electronic chip reader (e.g., NFC chip reader), the reader 130 may be configured to receive information from chips having passive data transmission capabilities. In some implementations, the reader 130 may be contactless with the authenticated article 110. The reader 130 may supply power to the authenticated article 110, e.g., to an unpowered NFC chip or other passive communication device. The reader 130 may receive from the authenticated article 110 stored information, for instance using near field communication protocol and may operate on the 13.56 MHz frequency. The reader 130 may receive information from the authenticated article 110, for instance, when the authenticated article 110 is contacting or within about 1 inch to 3 feet away from the reader 130, e.g., about 0.5 to 2.5 in., or 2 in. or less. Although examples use an NFC chip as the authenticated device, implementations may use other devices for transmission of information to a reader 130, and for instance, a web address generated by a QR code stored on the authenticated article 110 may be sensed, or the web address printed on the object may be directly entered into a web browser of the device carrying the reader 130. When the reader 130 is a component of a mobile phone or other mobile device, the device may be configured to receive wireless communications, and may also include a web browser, GPS functionality, a camera, a microphone, and an accelerometer. Alternatively, the reader 130 may include features of a mobile phone but may not be a mobile phone. In response to receiving or reading information via the reader 130, the device carrying the reader 130 may initiate certain of its features including the web browser, the camera, the microphone and/or the accelerometer. In addition or alternatively, the mobile phone may send a push notification to the second user requesting one or more of these features be activated.

The server 150 may host the network-based service 160 accessed by the second user via the reader 130. In FIG. 1B, the server 150 may be implemented as a virtual private cloud (or similar web server solution). The server 150 may include one or more processing units, computer readable media and storage. The term computer readable media is used to refer to a single computer readable medium in some embodiments, and in other embodiments multiple computer readable media in communication with one or more processing units. The computer readable media and/or storage may include any form of computer readable storage or computer readable memory, transitory or non-transitory, including but not limited to, externally or internally attached hard disk drives, solid-state storage, tiered storage solutions, storage area networks, network attached storage, and/or optical storage. As provided herein, the instructions stored on the computer readable media may be executed on the one or more processing units or other processing units of the server 150. The server 150 may maintain, update, and create user accounts for first users enrolled in the network 100, and for instance may be a server 150 operated by a peacekeeping authority or a municipality. For instance, the server 150 may be operated by a police station and may operate as a police station's officer monitoring system, or server 150 may be communicatively coupled to such monitoring systems. In this example, the server 150 may store or be communicatively coupled to body camera data streams of body cameras worn by officers while on duty. In such implementations, when a first user 10 is on duty and wearing a camera, the footage of an encounter may be timestamped and such footage and timestamping may be uploaded to the server 150 and/or to systems communicatively coupled to the network 100. Timestamps of the camera footage may be used, for instance, in connection with determining the first user is an assigned user of the authenticated device 110. In some implementations, a body camera may be configured as an authenticated mobile device 115 provided herein. When using a body camera in connection with the present disclosure, a timestamp at the start of an encounter, and a timestamp at the end of the encounter may be identified, and footage of the camera during an associated timeframe may be stored in the server 150 for use in authentication and/or for use in the data processing layer 170 described herein. In some implementations, the camera may not be network enabled and may be used for instance, in post-encounter analyses, while in other implementations, the camera may be coupled to the network 100 such that information may be received into the network 100 from the camera in real-time. When network enabled, for instance, the camera may transmit information wirelessly such as by being connected to a patrol car computer by Bluetooth.

The network-based service 160 may be configured as a web or native application powered by the server 150. The application may contain scripts that transmit data between the device components associated with the reader 130 (e.g., the web interface of the mobile phone carrying the reader 130) and the data solution. The data solution may include but is not limited to another application, blockchain technology, or a backend server script using a database technology.

According to implementations, the server 150 and network-based service 160 may be communicatively coupled to a data processing layer 170, which may include but is not limited to processing solutions including business scripts that receive the data transmitted from the network-based service 160, decrypts the data and validates the origin of the NFC chip scan. The script may then retrieve assigned user's information from a storage solution such as a database or blockchain network where the account information of the assigned user of the authenticated device 110 is stored.

The server 150 may implement data analytics 180, which may be performed on the data processing layer 170. Data analytics may be performed on the data stored in the data processing layer, which may occur independently of the interaction that created it, e.g., independently of the reader 130 sending data to the server 150. For instance, analysis of the data may be performed to generate statistics used to improve or promote the product, offer meaningful insight into the larger group of interactions generated by the NFC chip transaction. Analysis of the data may be performed by an entity such as a data analyst, a generative AI engine, or neural network.

Figure 2:
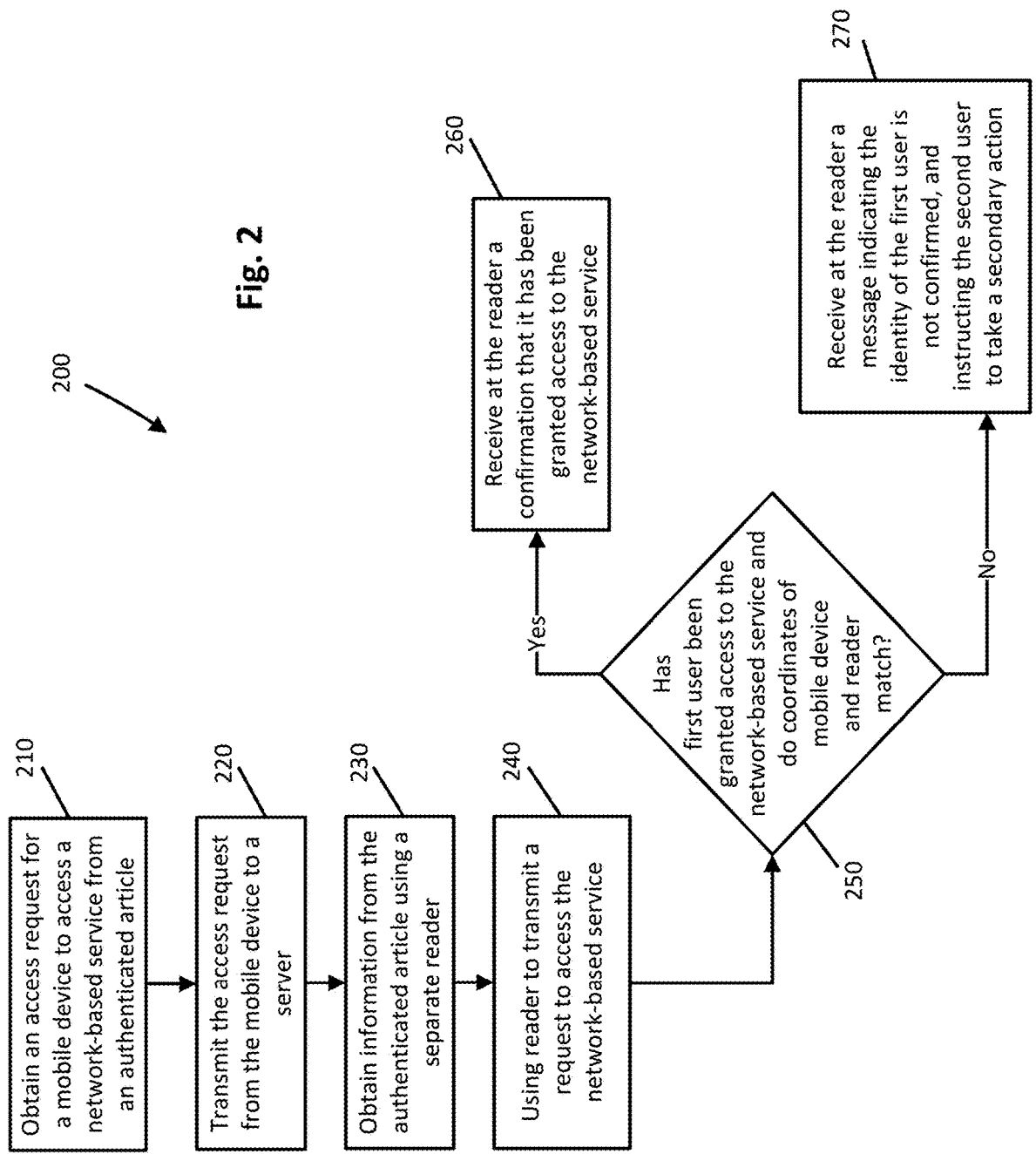
FIG. 2 depicts a method of verifying a first user of an authenticated device and authenticated article during an encounter with a second user in possession of a reader, according to the present disclosure.

Referring to FIG. 2, a flow chart depicting a method 200 of verifying the first user 10 of an authenticated device 115 and authenticated article 110 during an encounter with a second user 20 in possession of a reader 130 is provided, according to the present disclosure. The method 200 may be implemented over the network 100 of FIG. 1.

In method 200, the first user 10 may pair the device 115 and article 110 in their possession by entry of the user's unique identification information into the network 100. The method 200 may begin in step 210 by obtaining, from the NFC device 112 held by the authenticated article 110, an access request for the mobile device 115 to access the network-based service 160. The access request may be obtained based on confirming biometric information associated with the access request corresponds to previously stored biometric information 11 of the first user 10. Such previously stored biometric information 11 may be stored on the authenticated article 110, e.g., in memory of the NFC device 112, on the mobile device 115, on the server 150, on the network-based service 160 or combinations thereof. For instance, biometric information 11 read from the first user 10 by the input region 111 of the authenticated article 110 may unlock the NFC device 112 to permit the access request to be obtained by the mobile device 115. In examples, the NFC device 112 may confirm the entered biometric information matches the biometric information 11 of the first user 10 stored therein. In some cases, prior to confirming biometric information associated with the access request corresponds to previously stored biometric information 11 of the first user 10, the NFC device 112 and thus the authenticated article 110 may be prevented from transmitting the access request to the mobile device 115. In such cases, the NFC device 112 may optionally transmit other information such as information obtained from the input region of the authenticated article 110. The access request may be obtained by the reader 116 of the mobile device 115 being placed in close proximity to the authenticated article 110 to enable the NFC device 112 to transmit information to the mobile device 115. The information obtained from the access request may be compared against previously stored information about the first user 10 to authenticate the mobile device 115. For example, account information (e.g., an enrollment ID) of an account of the first user 10 enrolled in the network-based service 160 may be obtained from the access request and compared against account information stored locally at the mobile device 115 or by the server 150 or network-based service 160 may be used for authentication. In some cases, the input region 117 may be used to obtain biometric information 11 of the first user 10 which may be used to compare against previously stored biometric information 11 of the first user. In examples, providing multiple input regions 111, 117 may enable the system to authenticate and pair the authenticated article 110 and mobile device 115 using multiple inputs, such as multiple biometric inputs such as multiple fingerprints of the same or a different finger, or fingerprint(s) and/or a facial image and/or iris scan(s) and/or other biometric information. Upon determining correspondence, the authenticated article 110 and the mobile device 115 may be authenticated and paired.

In step 220, the access request may be transmitted from the authenticated mobile device 115 to the server 150 requesting the mobile device 115 receive access to the network-based service 160 enabling the authenticated mobile device 115 to gain access the network-based service 160. The access request of the authenticated mobile device 115 may be transmitted through wired or wireless technologies including but not limited to cellular networks, wireless home networks, or Ethernet LAN. The data may be transmitted bi-directionally and its contents may be dependent on the requirements of the transaction being processed. The access request of authenticated mobile device 115 may include information obtained from the authenticated article 110 along with a location of the authenticated mobile device 115, e.g., GPS coordinates of the authenticated mobile device 115, and other information such as information stored on the authenticated mobile device 115 about the first user 10. Other location information may be provided in addition to or as an alternative to GPS coordinates, such as a location on a map, or by other approaches as determined by components of the authenticated mobile device 115 (e.g., the CPU and GPS hardware and software of a mobile phone or of a network enabled body camera). In some examples, the authenticated mobile device 115 may receive a confirmation it has been granted access to the network-based service 160 based on the access request.

The method 200 proceeds using a reader 130 of the second user 20, and in step 230 the reader 130 may obtain information from the authenticated article 110. The information may be obtained from the NFC device 112 or from the content 114 of the authenticated article 110. In step 240, the reader 130 may transmit an access request to the server 150 or other host for the reader 130 to access the network-based service 160. For instance, the reader 130 may display and send the access request directly to the server 150 or may transmit the request to the server 150 through a web browser or native application. The access request may be transmitted through wired or wireless technologies including but not limited to cellular networks, wireless home networks, or Ethernet LAN. The data may be transmitted bi-directionally and its contents may be dependent on the requirements of the transaction being processed. The access request of the reader 130 may include information obtained from the authenticated article 110 along with a location of the reader 130, e.g., GPS coordinates of the reader 130, and other information such as information stored on the reader 130 about the second user 20. For instance, information obtained from the authenticated article 110 may include information about the identity of the first user 10 of the authenticated article 110 along with a link to request access the network-based service 160. The GPS coordinates of the reader 130 may be obtained and transmitted by the reader to the network-based service 160. In some examples, upon the server 150 receiving the access request from the reader 130, the authenticated mobile device 115 may transmit its location to the server 150. In addition or alternatively, an access request of the authenticated mobile device 115 including the location of the device 115 may be transmitted to the server 150 during the encounter between the first and second users 10, 20 (e.g., slightly before, during, or after the reader 130 transmits the access request). In some cases, when the reader 30 obtains information from the authenticated article 110, the NFC device 112 may transmit a signal to the authenticated mobile device 115 to cause the authenticated mobile device 115 to transmit its location to the server 150.

Based on the information and location information transmitted by the reader 130, in step 250, the server 150 may determine whether the first user 10 has been granted access to the network-based service (e.g., by confirming step 220 occurred) and whether a location match is present between the authenticated mobile device 115 and the reader 130. A location match may be determined for instance when the devices 115 and 130 are in the same location, e.g., within 0 to 500 feet of each other. In addition, the server 150 may determine whether the location information includes timestamps within a timeframe corresponding to the encounter between the first and second users, such as within 1 second to 5 minutes of each other. Particularly, while the authenticated article 110 is a separate device from the authenticated mobile device 115, when the first user 10 is an assigned user, this person would typically carry both the article and device 110, 115, or these would be in close proximity to each other and to the first user 10. As a result, determining the location of the authenticated mobile device 115 and comparing this location with the location of the reader 130 held by the second user 20 is used as verification step for verifying the first user of the authenticated device 110 is an assigned user, i.e., the first user is who they say they are, according to the present disclosure. In some examples, when the location match is present, the server 150 may generate a timestamp and location record of one or more of the authenticated mobile device 115 or the reader 130.

In step 260, the reader 130 may receive confirmation that it has been granted access to the network-based service 160 upon the server 150 confirming the location match and network access of the authenticated mobile device 115. For instance, the server 150 may return a confirmation message that access to the network-based service 160 has been provided to the reader 130, which may be accompanied by account information 155 (FIG. 1) about the assigned first user 10 of the authenticated article 110. For example, a confirmation of the identity of the first user 10 may be displayed, optionally with a user interface for the second user 20 provide input into the network-based service account of the first user 10. The second user 20 may determine that the assigned user of the authenticated article 110 for instance by comparing a photograph or badge information displayed on a screen of the reader 130 to the first user 10 holding the authenticated article 110 and purporting to be the assigned user.

The confirmation step 260 may be provided in the form of a website (e.g., a unique webpage dedicated to the assigned user of the authenticated device 110), text message, and so on. For instance, the server 150 may send a webpage or a link to a webpage to the reader 130 that provides detailed information about the assigned and verified first user of the authenticated device 110, such as a website that displays a picture of the assigned user, their badge number, name, gender, employment location, activity status (e.g., on duty or off duty) and other information. Alternatively, the information may be a simple message that the assigned user of the authenticated article 110 is verified. The confirmation may additionally include the ability for the second 20 user to engage with features of the system. For instance, the second user may engage in a website for rating and reporting the first user's performance during the encounter, or may request an option for recording the encounter in real-time, may request a call or video chat with a supervisor of the verified, assigned user during the encounter. In addition, the second user may be provided access to links to electronic information of second user and/or their supervisor, to forms for complaints, to forms for contacting dispatch, to surveys, and so on. In some implementations, the server 150 may automatically implement such functions for monitoring the encounter. Due to the verification of the assigned user, this may enable the system 100 to track the dialogue between the first user and the second user. In addition, the verification protocol of the present disclosure may be used to establish a secure recording from one or more of the devices including the reader, the authenticated mobile device, or another device in an area proximate the authenticated device that is transmitted to a secure data recording medium such as a memory coupled to the server 150 which may be configured as a distributed ledger (e.g., a blockchain system) or may be coupled to a distributed ledger. The verification protocol used to initiate data transmission to secure data recording medium may provide the ability to leverage authenticated devices that may otherwise be unavailable for use in secured communications due to the authenticated article having only limited data transmission and storage abilities (e.g., NFC chips with limited ability to store and transmit data). Moreover, verification of the assigned user according to the present disclosure further provides a confirmation that the second user 20 is interacting with an assigned user, and thus the second user's input into the network 100, e.g., via a cellular phone coupled to or serving as the reader 130, may be assigned a level of authentication in the network 100 due to their direct encounter with the assigned user. This may enable the network 100 to track a dialogue or other communications between the first user and the second user, and the verified status of the encounter may be included as data in the first user's account in the network 100. In some implementations, the verified status of the encounter may be used in data analysis for use by the server 150 and other components of the network 100 in analyzing the assigned user's performance during encounters with a group of second users.

Alternatively, the second user 20 may determine that the first user 10 is not the same person as identified in the reader 130 and may take further action, such as requesting assistance from others including via the network 100. Accordingly, in step 270, when a location match is not present between the reader 130 and the authenticated mobile device 115 or the first user 10 has not been granted access to the network-based service 160, the server 150 may transmit a message to the reader 130 indicating the identity of the first user 10 is not confirmed, and instructing the second user 20 to take a secondary action. For instance, the second user 20 may be instructed to request that the first user 10 enter their biometric information into an input region 111 and/or 117 of the authenticated article 110 and/or the authenticated mobile device 115. In this case, the first user 10 may also receive a similar notification. In some cases, secondary verification information may be instructed to be obtained for the first user, which may be accomplished using the reader 130, the authenticated mobile device 115, or another device communicatively coupled to the server 150 (e.g., a separate mobile device of a person involved in the encounter). In this case, the server 150 may receive one or more of voice verification information, biometric verification information, facial recognition information, or accelerometer verification information of the first user from one of these remote devices, and may determine whether a secondary verification match is present between the received secondary information and information previously stored in an account of the first user. When the server 150 determines a secondary verification match is present, the server 150 may return to confirmation step 260, and for instance may transmit for display a confirmation of the identity of the first user, and may authorize the second user to provide input into an account of the first user for storage in memory coupled to the server 150. When the server 150 determines a secondary verification match is not present, the server may notify a peacekeeping authority (e.g., may contact an emergency service such as 911 or a police station) or may notify a supervisor of a user assigned to the authenticated device 110, and in connection with such notification may provide the location of the reader 130 and thus the second user 20. In examples, the second user 20 may be instructed to contact a peacekeeping authority or a supervisor of the first user assigned to the article holding the authenticated article 110.

An objective of method 200 is to ensure the first user 10 is in possession of the authenticated article 110 and the authenticated mobile device 115 when used in connection with an encounter with the second user 20. The steps 210 to 220 involving pairing of the authenticated article 110 and of the authenticated mobile device 115 in method 200, however, may take place prior to or during an encounter between the first user 10 and the second user 20, while the step of determining a location match is present between the authenticated mobile device 115 and reader 130 may take place during the encounter. For instance, steps 210 to 220 may proceed prior to such an encounter, such as when the first user 10 logs into the network-based service 160, which may be at the beginning of their work shift. In this example, the authenticated mobile device 115 may be granted access to the network-based service in step 230 for a pre-defined period of time, such as for the duration of the work shift of the first user 10. The method 200 may additionally involve the first user 10 activating their assigned authenticated article 110 at the beginning of their work shift such as by placing the authenticated article 110 in an area proximate the authenticate mobile device 115 or by placing the authenticated article 110 at a separate computing device managed by the user's employer so that information from the NFC device 112 can be transmitted to such device for activation of the authenticated article 110 for the pre-determined period of time. In such cases, based on receiving the access request from the reader 130 in step 240, the server 150 may determine whether the request falls within the time window during which the authenticated mobile device 115 has been granted access to the network-based service 160. In this example, when a location match is present but the predetermined period of time has expired, step 270 of method 200 may proceed and the server may transmit a message to the reader 130 indicating the identity of the first user 10 is not confirmed, and instructing the second user 20 to take a secondary action.

Systems and methods for verifying an identity of a first user are also disclosed in commonly-owned U.S. Pat. No. 11,706,627, which is herein incorporated by reference for any useful purpose.

Various functionalities described herein may be accomplished with the use of a computer, including the controller or microprocessor and non-transitory computer readable medium or memory, with instructions stored thereon to be executed by the controller or processor. For instance, a computer-readable storage medium with an executable program stored thereon may instruct the controller or processor to perform the functions provided herein.

Various changes may be made in the form, construction and arrangement of the components of the present disclosure without departing from the disclosed subject matter or without sacrificing all of its material advantages. The form described is merely explanatory, and it is the intention of the following claims to encompass and include such changes. Moreover, while the present disclosure has been described with reference to various embodiments, it will be understood that these embodiments are illustrative and that the scope of the disclosure is not limited to them. Many variations, modifications, additions, and improvements are possible. Functionality may be separated or combined in blocks differently in various embodiments of the disclosure or described with different terminology. These and other variations, modifications, additions, and improvements may fall within the scope of the disclosure as defined in the claims that follow.

What is claimed is:
1. A method for verifying an identity of a first user over a network, the method comprising:
   at a first computing device:
      obtaining, from a near-field communication device held by an article, an access request for the first computing device to access a network-based service, wherein the first computing device is separate from the article holding the near-field communication device, and wherein the access request is obtained based on confirming biometric information associated with the access request corresponds to previously stored biometric information of the first user, said confirming biometric information involves the first user entering biometric information into the article holding the near-field communication device, and by the article holding the near-field communication device confirming the entered biometric information matches the previously stored biometric information, said previously stored biometric information being stored in the near-field communication device held by the article;
      transmitting the access request from the first computing device, over the network, requesting the first computing device receive access to the network-based service; and at a second computing device:
    obtaining, from the article holding the near-field communication device, a second set of information, wherein the second computing device is separate from the article holding the near-field communication device;
    transmitting a request from the second computing device, over the network, for the second computing device to access the network-based service, wherein the request from the second computing device comprises the second set of information obtained from the article holding the near-field communication device and a location of the second computing device; and
    receiving confirmation that the second computing device has been granted access to the network-based service based on the network-based service confirming a location match is present between the first and second computing devices and confirming the first computing device has been granted access to the network-based service, wherein the confirmation comprises a confirmation of the identity of the first user.

2. The method of claim 1, wherein prior to the confirming biometric information associated with the access request corresponds to previously stored biometric information of the first user, the near-field communication device is prevented from transmitting the access request to the first computing device.

3. The method of claim 1, further comprising, at the second computing device, displaying a confirmation of the identity of the first user, and a user interface for a user of the second communication device to provide input into an account of the first user for storage in memory of the network.

4. The method of claim 1, further comprising, at the first computing device, receiving a confirmation that the first computing device has been granted access to the network-based service based on the access request.

5. The method of claim 1, wherein the first device transmits a location of the first device based on the second computing device transmitting the request to access the network-based service.

6. The method of claim 1, wherein the first device transmits a location of the first device based on the second set of information being obtained.

7. The method of claim 1, wherein the first computing device is a first mobile device and wherein the second computing device is a second mobile device.

8. A method for verifying an identity of a first user over a network, the method comprising:
at a first computing device:
    obtaining, from a near-field communication device held by an article, an access request for the first computing device to access a network-based service, wherein the first computing device is separate from the article holding the near-field communication device, and wherein the access request is obtained based on confirming biometric information associated with the access request corresponds to previously stored biometric information of the first user;
    wherein prior to transmitting the access request, authenticating the first computing device using information from the access request;
    upon authenticating, transmitting the access request from the first computing device, over the network, requesting the first computing device receive access to the network-based service; and
at a second computing device:
    obtaining, from the article holding the near-field communication device, a second set of information, wherein the second computing device is separate from the article holding the near-field communication device;
    transmitting a request from the second computing device, over the network, for the second computing device to access the network-based service, wherein the request from the second computing device comprises the second set of information obtained from the article holding the near-field communication device and a location of the second computing device;
    receiving confirmation that the second computing device has been granted access to the network-based service based on the network-based service confirming a location match is present between the first and second computing devices and confirming the first computing device has been granted access to the network-based service, wherein the confirmation comprises a confirmation of the identity of the first user.

9. A method for verifying an identity of a first user over a network, the method comprising:
    receiving, by a network processor, a network access request for an authenticated first computing device of the first user to access to a network-based service of the network, wherein the network access request of the authenticated first computing device is received at least based on receiving authentication information corresponding to biometric information of the first user stored in the authenticated first computing device matching biometric information of the first user stored in a near-field communication device held by an article, wherein the authenticated first computing device is separate from the article holding the near-field communication device;
    granting, by the network processor, the authenticated first computing device access to the network-based service;
    receiving, by the network processor, a request from a second computing device communicatively coupled to the network-based service, wherein the request comprises a first set of information retrieved from the near-field communication device held by the article and a second set of information related to the communicatively coupled second computing device from which the request was sent, wherein the second computing device is separate from the article holding the near-field communication device,
        wherein the first set of information comprises an identification of the first user,
        wherein the second set of information comprises a location of the communicatively coupled second computing device;
    retrieving, by the network processor, a location of the authenticated first computing device;
    determining, by the network processor, whether a location match is present between the second computing device and the authenticated first computing device,
    granting, by the network processor, the second computing device access to the network-based service based on determining the location match is present and based on confirming the authenticated first computing device has been granted access to the network-based service, wherein the granted access comprises providing access to information of the first user at the second computing device and a confirmation of the identity of the first user.

10. The method of claim 9, wherein, upon determining the location match is present, generating, by the network processor, a timestamp and location record of one or more of the authenticated first computing device or the second computing device.

11. The method of claim 9, wherein, upon granting the second computing device access to the network-based service, enabling a user of the second computing device to provide input into an account of the first user for storage in the network-based service.

12. The method of claim 9, wherein when the location match is not present or the first user has not been granted access to the network-based service, transmitting for display, by the network processor, a message to the second computing device indicating the identity of the first user is not confirmed, and instructing a user of the second computing device to take a secondary action.

13. The method of claim 12, wherein the instructions for taking the secondary action comprise instructions for contacting a peacekeeping authority or a supervisor of the first user assigned to the article holding the near-field communication device.

14. The method of claim 9, wherein the granting of the authenticated first computing device access to the network-based service is for a pre-determined period of time; and wherein the network processor grants the second computing device access to the network-based service based on determining the location match is present during the pre-determined period of time.

15. The method of claim 14, wherein when the location match is present after the pre-determined period of time has expired, the method further comprises, transmitting for display, by the network processor, a message to the second computing device indicating the identity of the first user is not confirmed, and instructing a user of the second computing device to take a secondary action.

16. The method of claim 15, wherein the instructions for taking the secondary action comprise instructions for contacting a peacekeeping authority or a supervisor of the first user assigned to the article holding the near-field communication device.

* * * * *